United States Patent
Czaplicki et al.

(10) Patent No.: US 12,421,366 B2
(45) Date of Patent: Sep. 23, 2025

(54) TWO-COMPONENT PHOSPHATE ESTER CAVITY FILLING SEMI RIGID FOAM

(71) Applicant: Zephyros, Inc., Romeo, MI (US)

(72) Inventors: Michael Czaplicki, Romeo, MI (US); Kevin Hicks, Romeo, MI (US)

(73) Assignee: Zephyros, Inc., Romeo, MI (US)

( * ) Notice: Subject to any disclaimer, the term of this patent is extended or adjusted under 35 U.S.C. 154(b) by 113 days.

(21) Appl. No.: 17/289,166

(22) PCT Filed: May 6, 2019

(86) PCT No.: PCT/US2019/030831
§ 371 (c)(1),
(2) Date: Apr. 27, 2021

(87) PCT Pub. No.: WO2020/101732
PCT Pub. Date: May 22, 2020

(65) Prior Publication Data
US 2021/0395478 A1 Dec. 23, 2021

Related U.S. Application Data

(60) Provisional application No. 62/767,543, filed on Nov. 15, 2018.

(51) Int. Cl.
*C08J 9/06* (2006.01)
*C08J 9/00* (2006.01)

(52) U.S. Cl.
CPC ........... *C08J 9/0066* (2013.01); *C08J 9/0038* (2013.01); *C08J 9/0095* (2013.01); *C08J 2363/00* (2013.01)

(58) Field of Classification Search
None
See application file for complete search history.

(56) References Cited

U.S. PATENT DOCUMENTS

| | | | |
|---|---|---|---|
| 2,541,027 A | 2/1951 | Bradley | |
| 2,831,820 A | 4/1958 | Aase et al. | |
| 3,256,240 A | 6/1966 | Smith | |
| 3,282,863 A | 11/1966 | Carey et al. | |
| 3,317,471 A | 5/1967 | Johnson et al. | |
| 4,016,112 A | 4/1977 | Kajiura et al. | |
| 4,164,487 A | 8/1979 | Martin | |
| 4,164,489 A | 8/1979 | Martin | |
| 4,196,270 A | 4/1980 | Chattha | |
| 4,438,254 A | 3/1984 | Doorakian et al. | |
| 4,613,661 A | 9/1986 | Langer | |
| 4,619,860 A | 10/1986 | Brown et al. | |
| 4,647,648 A | 3/1987 | Silvis et al. | |
| 4,820,784 A | 4/1989 | Massingill et al. | |
| 4,992,525 A | 2/1991 | Kriessmann et al. | |
| 5,086,094 A | 2/1992 | Massingill, Jr. | |
| 5,115,075 A | 5/1992 | Brennan et al. | |
| 5,331,080 A | 7/1994 | Swarup et al. | |
| 5,552,070 A | 9/1996 | Schafer | |
| 5,648,401 A * | 7/1997 | Czaplicki | C08J 9/08 521/85 |
| 5,759,691 A | 6/1998 | Scholz et al. | |
| 6,011,111 A | 1/2000 | Brennan et al. | |
| 6,110,982 A * | 8/2000 | Russick | C08J 9/04 521/97 |
| 6,730,713 B2 | 5/2004 | Czaplicki | |
| 7,087,663 B2 | 8/2006 | Feola et al. | |
| 7,097,794 B2 | 8/2006 | McLeod et al. | |
| 7,445,400 B2 | 11/2008 | Takeuchi | |
| 7,579,068 B2 | 8/2009 | Allen et al. | |
| 7,838,100 B2 | 11/2010 | McLeod et al. | |
| 9,067,382 B2 | 6/2015 | Shepherd et al. | |
| 9,187,592 B2 | 11/2015 | Finter et al. | |
| 10,106,711 B2 | 10/2018 | Elgimiabi | |
| 10,550,220 B2 | 2/2020 | Czaplicki et al. | |
| 10,557,015 B2 | 2/2020 | Piestert | |

(Continued)

FOREIGN PATENT DOCUMENTS

| | | |
|---|---|---|
| CN | 107624123 A | 1/2018 |
| EP | 0188689 A2 | 7/1986 |

(Continued)

OTHER PUBLICATIONS

Jiao et al., "Synthesis and properties of a phosphate ester as curing agent in an epoxy resin system," Iran Polym J, (2014) 23: 5941-598. (Year: 2014).*
Canadian Examiner's Report dated Aug. 9, 2022, Application No. 3,117,663.
Japanese First Office Action dated Mar. 2, 2023, Application No. 2021523472.
Canadian Second Office Action dated Mar. 29, 2023, Application No. 3117663.
Xian-Ling Eu et al: "Two-dimensional 1-36 cardonal-derived zircomium phosphate as flame retardant and smoke depressant for epoxy resins.e", Polymer Degradation Fand Stability, vol. 151, Jun. 3, 2018.

(Continued)

Primary Examiner — K. Boyle
(74) Attorney, Agent, or Firm — The Dobrusin Law Firm, P.C.

(57) ABSTRACT

The present teachings provide a method and composition related to two component epoxy phosphate ester based foam materials. The present teachings provide a method comprising: providing a two component system, the two component system including an A side and a B side, the A side including epoxy and the B side including phosphate ester and phosphoric acid; mixing the A side and the B side to form a resulting reaction product; wherein the resulting reaction product of the A side and the B side cures at a temperature of less than 50° C. The present teachings provide a composition comprising: a) a first component including epoxy; b) a second component including phosphate ester and phosphoric acid; and wherein a resulting reaction product of the first component and second component cures at a temperature of less than 50° C.

18 Claims, No Drawings

(56) References Cited

U.S. PATENT DOCUMENTS

| | | |
|---|---|---|
| 11,535,698 B2 | 12/2022 | Czaplicki |
| 2002/0192387 A1 | 12/2002 | Agarwal et al. |
| 2003/0060522 A1 | 3/2003 | Czaplicki et al. |
| 2003/0060523 A1 | 3/2003 | Czaplicki |
| 2004/0077801 A1 | 4/2004 | Feola et al. |
| 2007/0270515 A1 | 11/2007 | Chmielewski et al. |
| 2008/0161432 A1* | 7/2008 | Korwin-Edson .......... C08J 9/08 521/72 |
| 2009/0298974 A1 | 12/2009 | Chmielewski et al. |
| 2018/0037695 A1 | 2/2018 | Czaplicki et al. |
| 2018/0111349 A1 | 4/2018 | Polidore et al. |
| 2018/0155519 A1 | 6/2018 | Shepherd et al. |
| 2021/0395475 A1 | 12/2021 | Abe et al. |

FOREIGN PATENT DOCUMENTS

| | | |
|---|---|---|
| EP | 0253005 A1 | 1/1988 |
| EP | 0288942 A2 | 11/1988 |
| EP | 0794236 A1 | 9/1997 |
| EP | 2060592 | 5/2009 |
| EP | 2426160 | 9/2012 |
| EP | 2551992 B1 | 4/2017 |
| EP | 3880742 A1 | 3/2023 |
| JP | S63-305121 A | 12/1988 |
| JP | H09227709 A | 9/1997 |
| JP | 1998101836 A | 4/1998 |
| JP | H10101836 A | 4/1998 |
| JP | H11013166 A | 1/1999 |
| JP | 2001081223 A | 3/2001 |
| JP | 2004002385 A | 1/2004 |
| JP | 2004-099663 A | 4/2004 |
| WO | 98/14498 | 4/1998 |
| WO | 2008/010823 A2 | 1/2008 |
| WO | 2008/131918 A1 | 11/2008 |
| WO | 2014/198573 | 12/2014 |
| WO | 2016/149700 A1 | 9/2016 |
| WO | 2020/101732 A1 | 5/2020 |
| WO | 2020/198139 A1 | 10/2020 |

OTHER PUBLICATIONS

Somisetti Varaprasad et al: "Multifunctional polyurethane coatings derived from phosphate cardanol and undecylenic acid based polyols", Progress in Organic Coatings, vol. 134, May 9, 2019, pp. 91-102, XP085721770, ISSN: 0300-9440, DOI: 10.1016/J.Porgcoat.2019.04.077 Scheme 2, p. 94.

India Examination Report dated Nov. 15, 2022, Application No. 202117018838.

PCT International Search Report & Written Opinion dated Jul. 22, 2019, Application No. PCT/US2019/030831.

Chinese First Office Action dated Aug. 17, 2022, Application No. 201980075521.4.

Chinese First Office Action dated Jul. 3, 2019, Application No. 201680028264.5.

Ifuku; Shinsuke, Amino Acid-Cured Bio-Based Epoxy Resins and their Biocomposites with Chitin and Chitosan-Nanofibers, Eur. Polym. J., 98 2018, pp. 216-225 (Year: 2018).

Non-Final Office Action dated Mar. 12, 2024, Application No. U.S. Appl. No. 17/422,922.

European Communication dated Jun. 26, 2024, Application No. EP19728790.7.

Final Office Action dated Aug. 12, 2024, Application No. U.S. Appl. No. 17/422,922.

Applicant-Initiated Interview Summary dated Dec. 2, 2024, Application No. U.S. Appl. No. 17/422,922.

Brazil Office Action dated Aug. 20, 2024, Application No. BR112021009469-5.

Australia Examination Report dated Jan. 2, 2025, Application No. 2019379502.

* cited by examiner

TWO-COMPONENT PHOSPHATE ESTER CAVITY FILLING SEMI RIGID FOAM

FIELD

The present teachings relate generally to two component epoxy phosphate ester based foam materials.

BACKGROUND

Foam materials are frequently employed in the transportation and construction industries for a variety of purposes. For example, foam materials may provide one or more of structural support, sealing and sound attenuation. Where room-temperature activation (e.g., expansion) is desired, polyurethane-based foams are most common. Polyurethane foams have a number of drawbacks, some of which are inclusion of isocyanate, a limited ability to adhere to certain substrates, poor hydrolysis resistance in wet or humid environments, unsuitability for use in slower reacting systems, high sensitivity to temperature changes during dispending and foaming, and a need for high specificity in mix ratios when formulating.

As an alternative to polyurethane-based foams, phosphoric acids for in-place foaming reactions in polymeric materials have been utilized. However, phosphoric acid leads to additional concerns. As one example, reaction time with phosphoric acid is very fast which is not ideal for assembly processes that require time to locate the polymeric material onto a surface prior to foaming. Thus, a somewhat delayed reaction time may be preferable. In some situations, the nature of phosphoric acid can have negative health and safety risks due to its low pH and splash hazard. Therefore, alternative materials with a reduced health and safety risk may be preferred. There is also a significant difference in viscosity between the phosphoric acid and the oligomeric or polymeric materials that may be reacted with it. This presents challenges to both manufacturing (e.g., mixing) and storage of the material. Phosphoric acid also has a much lower molecular weight, and by extension, molecular weight per functional reactive group than many oligomeric and polymeric materials, leading to undesirable mix ratios. Relatively similar mix ratios of 1:1 or 2:1 would be preferable. Lastly, the reactive nature of phosphoric acid makes it difficult to formulate adhesive and sealant materials as so many chemical components may be unstable when utilized in conjunction with phosphoric acid. It would be preferable to have the ability to include a variety of different moieties that may be advantageous for adhesion, physical or chemical compatibility, or other reasons.

PCT Patent Publication No. WO2016/149700 incorporated by reference herein for all purposes discloses the use of phosphate esters as an alternative to phosphoric acid. However, the addition of some amount of phosphoric acid in addition to an ester, may provide significant benefit to one or more of the speed of reactivity and additional functionality. For example, if reactivity is desired at lower temperatures, the addition of amount of phosphoric acid in combination with a phosphate ester may increase the speed of the reaction as compared with use of the phosphate ester alone. As another example, the addition of phosphoric acid may impart multi-functionality to a foaming material to prevent collapse of the foam. Such collapse may occur due to the reaction of the phosphate ester with a metal carbonate (which decreases the average functionality of the material). The addition of the phosphoric acid effectively compensates for the reaction between the metal carbonate and phosphate ester thereby minimizing collapse of the foam.

Notwithstanding the above teachings, there has remained a need for improved foam materials. There is a need for foam materials which provide room temperature cure. There is a need for foam materials which provide for expansion and cross-linking at reduced temperatures as compared to known foam materials. There is a need for foam materials which provide adhesion to a wide variety of substrates. There is need for foam materials which utilize a component capable of both curing and foaming without the need for additional components. There is a need for foam materials which provide desirable fire, smoke and toxicity (FST) properties while eliminating the use of undesirable agents for imparting the same.

The present teachings provide one or more of the above mentioned benefits. The foam materials of the present teachings may be utilized for one or more of the following: cavity filling, sealing, reinforcing, or damping.

SUMMARY

The present teachings provide a method comprising: providing a two component system, the two component system including an A side and a B side, the A side including an epoxy material and the B side including a phosphate ester and a phosphoric acid; mixing the A side and the B side to form a resulting reaction product; wherein the resulting reaction product of the A side and the B side cures at a temperature of less than 50° C.

The B side may include one or more phosphate esters. The A side, the B side, or both may include one or more fillers and/or one or more reinforcing materials. The A side may include one or more metal carbonates.

The foaming and curing reactions may occur at a temperature of from about 10° C. to about 35° C. The foaming and curing reactions may occur at higher and lower temperatures. The degree of foaming may change depending upon the temperature at which the foaming and curing occurs. The foaming and curing reaction may occur at a temperature of from about 15° C. to about 25° C.

The cure time of the resulting reaction product may be less than 15 minutes. The cure time of the resulting reaction product may be from about 5 minutes to about 10 minutes. The cure time may be 30 minutes or less. The cure time may be 60 minutes or less. The foaming time may be 10 minutes or less, 5 minutes or less, or even 1 minute or less. The foaming time may be less than the time to complete cure. The method may be free of any additional curing agent. The resulting reaction product may have a volume expansion of at least 200%.

The phosphoric acid may be added after preparation of the phosphate ester. The A side and B side may be mixed in a mix ratio by volume of from about 1:4 to about 4:1 (A side:B side). The A side and B side may be mixed in a mix ratio by volume of about 2:1 (A side:B side). The reaction product may fully expand in less than 10 minutes, less than 5 minutes, or even less than 2 minutes. The method may include a step of adding a second amount of phosphoric acid. The viscosity of the A side at 23° C. may be from about 20,000 cP to about 50,000 cP. The viscosity of the A side at 23° C. may be from about 35,000 cP to about 45,000 cP. The A side may be formulated with increased functionality to create an infinite network by using a functionality higher than two.

The present teachings further provide a composition comprising: a) a first component including an epoxy material; b)

a second component including a phosphate ester and a phosphoric acid. A resulting reaction product of the first component and second component cures at a temperature of less than 50° C.

The second component may include at least one phosphate esters. The second component may include at least two different phosphate esters. The first component, the second component, or both may include one or more fillers and/or one or more reinforcing materials. The first component may include calcium carbonate.

The cure temperature (e.g., the temperature at which the material begins to cure or completes curing) may be from about 10° C. to about 35° C. The cure temperature may be from about 15° C. to about 25° C.

The cure time of the resulting reaction product may be less than 15 minutes. The cure time of the resulting reaction product may be from about 5 minutes to about 10 minutes. The resulting reaction product may have a volume expansion of at least 200%.

The A side and B side may be in a mix ratio by volume of from about 1:4 to about 4:1 (A side:B side). The A side and B side may be in a mix ratio by volume of about 2:1 (A side:B side). The reaction product may fully expand in less than 10 minutes, less than 5 minutes, or even less than 2 minutes. The composition may include a second amount of phosphoric acid. The viscosity of the A side at 23° C. may be from about 20,000 cP to about 50,000 cP. The viscosity of the A side at 23° C. may be from about 35,000 cP to about 45,000 cP. The A side may be formulated with increased functionality to create an infinite network by using a functionality higher than two.

The present teachings also provide for a composition comprising a) a first component including one or more of: i) liquid epoxy resin; ii) flexible epoxy resin; iii) epoxy phenol novolac resin; iv) aliphatic multifunctional epoxy resin; v) calcium carbonate; vi) wollastonite; and vii) hydrophobic silica; and b) a second component including one or more of: i) a first phosphate ester; ii) a second phosphate ester; iii) hydrophobic silica; and iv) phosphoric acid; and wherein a resulting reaction product of the first component and second component cures at a temperature of less than 50° C.

DETAILED DESCRIPTION

The present teachings meet one or more of the above needs by the improved devices and methods described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application claims the benefit of the filing date of U.S. Provisional Application No. 62/767,543, filed Nov. 15, 2018, the contents of that application being incorporated by reference herein for all purposes.

The present teachings provide a method comprising: providing a two component system, the two component system including an A side and a B side. The A side including epoxy and the B side including phosphate ester and optionally phosphoric acid. The A side and the B side may be mixed to form a resulting reaction product. The resulting reaction product of the A side and the B side cures at a temperature of less than 50° C.

At least one component of the two component system may include phosphate ester. The phosphate ester may be produced by the reaction of phosphoric acid and various epoxide functional monomers, although other preparation methods are possible. The phosphate ester may be produced by the reaction of epoxidozed cashew nut liquid (CNSL) polymer to produce an epichlorohydrin phosphate. The phosphate ester may be used to produce 1,2-Propanediol, 3-[(2-ethylhexy)oxyl]-phosphate.

At least one component of the two component system may include one or more phosphate esters. At least one component of the two component system may include exactly two different phosphate esters. For example, the second component or B side may include a first phosphate ester and a second phosphate ester. The first phosphate ester may be a reaction product of epoxidized cashew nut liquid (CNSL) polymer to produce a phosphate ester. The second phosphate ester may be a reaction product of 2-Propanediol, 3-[(2-ethylhexy)oxyl]-phosphate.

The first phosphate ester may be present in an amount of about 55% to about 75% by weight of the second component or B side. The first phosphate ester may be present in an amount of about 60% to about 70% by weight of the second component or B side. The first phosphate ester may be present in an amount of about 60% by weight of the second component or B side. The first phosphate ester may be present in an amount of about 65% by weight of the second component or B side. The second phosphate ester may be present in an amount of about 15% to about 35% by weight of the second component or B side. The second phosphate ester may be present in an amount of about 20% to about 30% by weight of the second component or B side. The second phosphate ester may be present in an amount of about 25% by weight of the second component or B side. The second phosphate ester may be present in an amount of about 28% by weight of the second component or B side.

At least one component of the two component system may include phosphoric acid. Preferably, the component including the one or more phosphate esters also includes phosphoric acid. For example, the second component or B side may include one or more phosphate esters and phosphoric acid. The addition of phosphoric acid to the B side may result in increased expansion (e.g., foaming) of the resulting reaction product and/or decreased reaction time. The reaction time may be adjusted by the use of phosphoric acid concentrations. The addition of phosphoric acid to the B side may increase system reactivity to help maintain desired levels of expansion and/or curing when temperatures are below 23° C.

The phosphoric acid may be orthophosphoric acid. The phosphoric acid may be polyphosphoric acid. The phosphoric acid may be an 85% aqueous solution. The phosphoric acid may be present in an amount of about 1% to about 10% by weight of the second component or B side. The phosphoric acid may be present in an amount of about 5% to about 8% by weight of the second component or B side.

The curing and/or foaming may occur at a temperature of less than 40° C. The curing and/or foaming may occur at a temperature of less than 30° C. The curing and/or foaming may occur at a temperature of less than 20° C. The curing and/or foaming may occur at a temperature of from about 10° C. to about 35° C. The curing and/or foaming may occur at room temperature (e.g. at a temperature of from about 15° C. to about 25° C.). The curing and/or foaming may occur at a temperature of about 23° C. The curing and/or foaming may occur at a temperature of about 10° C.

The present teachings contemplate a relatively fast curing and/or foaming time as compared to other curing agents/cure systems that occur without the addition of a stimulus (e.g., at ambient or room temperature). For example, the cure time of the resulting reaction product may be less than 75 minutes. The cure time of the resulting reaction product may be less than 50 minutes. The cure time of the resulting reaction product may be less than 30 minutes, or even less than about 20 minutes. The cure time of the resulting reaction product may be from about 5 minutes to about 20 minutes. The cure time of the resulting reaction product may be about 10 minutes. The cure time of the resulting reaction product may be about 7 minutes. The cure time of the resulting reaction product may be about 5 minutes.

Foaming is likely to begin before complete cure of the resulting reaction product. The foaming time of the resulting reaction product may be less than 30 minutes, or even less than about 20 minutes. The foaming time of the resulting reaction product may be from about 30 seconds to about 10 minutes. The foaming time of the resulting reaction product may be about 5 minutes. The foaming time of the resulting reaction product may be about 7 minutes.

The foam materials described herein may also include epoxy-based materials, which may contain one or more epoxy resins. Epoxy resin is used herein to mean any of the conventional dimeric, oligomeric or polymeric epoxy materials containing at least one epoxy functional group. Moreover, the term epoxy resin can be used to denote one epoxy resin or a combination of multiple epoxy resins. The epoxy may be aliphatic, cycloaliphatic, aromatic or the like. The epoxy may be supplied as a solid (e.g., as pellets, chunks, pieces or the like) or a liquid (e.g., a liquid epoxy resin). As used herein, unless otherwise stated, a resin is a solid resin if it is solid at a temperature of 23° C. and is a liquid resin if it a liquid at 23° C. At least a portion of the epoxy resin may be liquid epoxy resin. For a solid epoxy to be used, it would typically require dissolution in a liquid resin.

The foam materials described herein may include a liquid epoxy resin. The liquid epoxy resin may be present as a part of the first component or A side of the two component system of the present teachings. The liquid epoxy resin may be a liquid reaction product of epichlorohydrin and bisphenol A. The liquid epoxy resin may have an epoxide equivalent weight (g/eq) of about 182 to about 192 as measured according to ASTM D-1652. The liquid epoxy resin may have an epoxide percentage of about 20 to about 25. The liquid epoxy resin may have a viscosity of 11000-14000 mPa·s at 25° C. as measured according to ASTM D-445. One preferred liquid epoxy resin is sold under the trade name D.E.R.™ 331.

The liquid epoxy resin may be present in an amount of about 10% to about 30% by weight of the first component or A side. The liquid epoxy resin may be present in an amount of about 15% to about 25% by weight of the first component or A side. The liquid epoxy resin may be present in an amount about 20% by weight of the first component or A side.

The foam materials described herein may include a flexible epoxy resin. The inclusion of flexible components may reduce modulus or possibly increase strain to failure. The flexible epoxy resin may improve the gas entrapment capability of the foam by acting as a viscosity modifier. The flexible epoxy resin may be present in of the first component or A side of the two component system of the present teachings. The flexible epoxy resin may be a di-functional glycidyl ether epoxy resin. The flexible epoxy resin may be a difunctional epoxy derived from cardanol which is obtained from cashew nutshell liquid (CNSL). The flexible epoxy resin may have an epoxide equivalent weight (EEW) of about 350 to about 500 according to ASTM D-1652-97. The flexible epoxy resin may have a viscosity of 10000-35000 cP at 25° C. as measured according to ASTM D2196. An exemplary flexible epoxy resin is sold under the trade name Cardolite NC-514 commercially available from Cardolite Corporation, Monmouth Junction NJ.

The flexible epoxy resin, if present, may be present in an amount of about 5% to about 25% by weight of the first component or A side. The flexible epoxy resin may be present in an amount of about 10% to about 20% by weight of the first component or A side. The flexible epoxy resin may be present in an amount of about 15% by weight of the first component or A side. The flexible epoxy resin may be present in an amount of at least about 5%, at least about 10% or even at least about 15% by weight of the first component or A side. The flexible epoxy resin may be present in an amount of less than about 50%, less than about 30% or even less than about 25% by weight of the first component or A side.

The foam materials described herein may also include an epoxy phenol novolac resin. The epoxy phenol novolac resin may be present as a part of the first component or A side of the two component system of the present teachings. The first component or A side may include a first epoxy phenol novolac resin and a second epoxy phenol novolac resin. The epoxy phenol novolac resin may have an epoxide equivalent weight (g/eq) of about 165 to about 178 as measured according to ASTM D-1652. The epoxy phenol novolac resin may have an epoxide equivalent weight (g/eq) of about 171 to about 183 as measured according to ASTM D-1652. The epoxy phenol novolac resin may have an average epoxy functionality of about 2.6 to about 3.6. For example, a first epoxy phenol novolac resin may have an epoxy functionality of about 2.6 and a second epoxy phenol novolac resin may have an epoxy functionality of about 3.6. The epoxy phenol novolac resin may have a viscosity of 18000-28000 cP at 25° C. The epoxy phenol novolac resin may have a viscosity of 20000-30000 cP at 52° C. Preferred flexible epoxy resin is sold under the trade name Epalloy 8250 and Epalloy 8330 commercially available from CVC Thermoset Specialties, Moorestown, NJ.

The epoxy phenol novolac resin may be present in an amount of about 1% to about 45% by weight of the first component or A side. The epoxy phenol novolac resin may be present in an amount of about 5% to about 35% by weight of the first component or A side. The epoxy phenol novolac resin may be present in an amount of about 10% to about 20% by weight of the first component or A side. The epoxy phenol novolac resin may be present in an amount of about 15% by weight of the first component or A side. The epoxy phenol novolac resin may be present in an amount of about 35% to about 40% by weight of the first component or A side. The epoxy phenol novolac resin may be present in an amount of at least about 5%, at least about 10% or even at least about 30% by weight of the first component or A side.

The epoxy phenol novolac resin may be present in an amount of less than about 70%, less than about 50% or even less than about 30% by weight of the first component or A side.

The foam materials may include an aliphatic multifunctional epoxy resin. The aliphatic multifunctional epoxy resin may be present as a part of the first component or A side of the two component system of the present teachings. The aliphatic multifunctional epoxy resin may be epoxidized sorbitol. The aliphatic multifunctional epoxy resin may have an epoxide equivalent weight (g/eq) of about 160 to about 195 as measured according to ASTM D-1652. The aliphatic multifunctional epoxy resin may have a viscosity of 8000-18000 cP at 25° C. One preferred aliphatic multifunctional epoxy resin is sold under the trade name Erisys GE-60 commercially available from CVC Thermoset Specialties, Moorestown, NJ.

The aliphatic multifunctional epoxy resin may be present in an amount of about 15% to about 35% by weight of the first component or A side. The aliphatic multifunctional epoxy resin may be present in an amount of about 20% to about 30% by weight of the first component or A side. The aliphatic multifunctional epoxy resin may be present in an amount of about 20% to about 25% by weight of the first component or A side.

It is possible that one or more of the A side components described herein may impart additional functionality to the A side. The B side may at least partially be formed as a salt utilizing at least some of the phosphoric acid and acid esters of the B side. This inherently reduces the reactive functionality of the B side. In an effort to compensate for this reduced functionality, the A side may be formulated with increased functionality to create an infinite network by using a functionality higher than two.

The foam materials may include a metal carbonate. The foam materials may include calcium carbonate. The calcium carbonate may be present as one or more calcium carbonate fillers and may be introduced from mineral fillers having minor metal carbonate concentrations. The one or more calcium carbonate fillers may have a median particle size of from about 3 to about 25 microns. The calcium carbonate may be a medium fine ground. For example, the median particle size of the calcium carbonate may be about 22 microns. An example of a preferred medium fine ground calcium carbonate is Hubercarb® Q200 commercially available from Huber Engineered Materials, Atlanta, GA The calcium carbonate may be a fine particle size. For example, the median particle size of the calcium carbonate may be 4 microns. An example of a preferred fine particle size calcium carbonate is Hubercarb® Q4 commercially available from Huber Engineered Materials, Atlanta, GA.

The calcium carbonate may be present as part of the first component or A side of the two component system of the present teachings. The calcium carbonate may be present in an amount of less than 40% by weight of the first component or A side, between about 10% and about 30% by weight of the first component or A side, or even between about 15% and about 25% by weight of the first component or A side. The calcium carbonate may be present in an amount of about 20% by weight of the first component or A side. The calcium carbonate may be present in an amount of at least about 5% by weight of the first component or A side, at least about 10% by weight of the first component or A side, or even at least about 15% by weight of the first component or A side. The calcium carbonate may be present in an amount of less than about 60% by weight of the first component or A side, less than about 45% by weight of the first component or A side, or even less than about 30% by weight of the first component or A side.

The first component or A side may include about 10% to about 20% by weight of medium fine ground calcium carbonate. The first component or A side may include about 15% by weight of medium fine ground calcium carbonate. The first component or A side may include about 2% to about 9% by weight of fine particle size calcium carbonate. The first component or A side may include about 5% to about 7% by weight fine particle size calcium carbonate. The first component or A side may include about 15% by weight of medium fine ground calcium carbonate and about 5% by weight of fine particle size calcium carbonate. For example, a ratio of a medium fine ground calcium carbonate to a ratio of a fine particle size calcium carbonate in the first component or A side may be about 3:1.

It is possible that the calcium carbonate may include a coating or may be selected in a specific size (e.g., a larger size) in an effort to delay or slow expansion of the material. The coating may be any material that will break down during the activation/expansion process. The coating may be a wax, a fatty acid, or combinations thereof.

The foam materials may include one or more minerals. The characteristic external shape of an individual crystal or crystal group of the mineral may be acicular or needle-like. The median particle size of the minerals may be about 10 µm to about 20 µm.

The foam materials may include a reinforcement material such as Wollastonite or calcium silicate. The Wollastonite may be relatively pure $CaSiO_3$. The Wollastonite may contain one or more of iron, magnesium, manganese, aluminum, potassium, sodium, or strontium substituting for calcium in the mineral structure. The median particle size of the Wollastonite may be about 18 µm. The median particle size of the Wollastonite may be about 12 µm. Preferred Wollastonite is sold under the trade name NYGLOS® 12 and NYGLOS® 8 commercially available from NYCO Minerals Inc., Willsboro, NY.

The wollastonite may be present as part of the first component or A side of the two component system of the present teachings. The wollastonite may be present in an amount of about 1% to about 10% by weight of the first component or A side. The wollastonite may be present in an amount of about 3% to about 7% by weight of the first component or A side. The wollastonite may be present in an amount of about 5% by weight of the first component or A side.

Complex minerals that include a metal carbonate concentration but so not solely comprise metal carbonate may be included as yet another means to slow or delay the expansion process.

The foam materials may include hydrophobic silica. The hydrophobic silica may be fumed. The fumed silica may be surface-treated with polydimethylsiloxane. The hydrophobic silica may be present as part of the first component or A side of the two component system of the present teachings. The hydrophobic silica may be present as part of the second component or B side of the two component system of the present teachings. The hydrophobic silica may be present as part of both the first and second component or A and B side of the two component system of the present teachings. Preferred hydrophobic silica is sold under the trade name AEROSIL® R 202 commercially available from Evonik Corporation, Parsippany, NJ.

The hydrophobic silica may be present in an amount of about 0.25% to about 2% by weight of the first component or A side. The hydrophobic silica may be present in an amount of about 0.5% to about 1.5% by weight of the first component or A side. The hydrophobic silica may be present in an amount of about 1% by weight of the first component or A side. The hydrophobic silica may be present in an amount of about 1 to about 10% by weight of the second component or B side. The hydrophobic silica may be present in an amount of about 1% to about 8% by weight of the second component or B side. The hydrophobic silica may be present in an amount of about 6% by weight of the second component or B side. For example, the ratio of hydrophobic silica in the first component or A side to the second component or B side may be from about 1:10 to about 10:1. The ratio of hydrophobic silica in the first component or A side to the second component or B side may be 1:6.

The foam materials may include calcined kaolin clay. The contamination of the clay with the metal carbonate may also stimulate the foaming (e.g., expansion) process. The calcined kaolin clay may be present as a part of the first component or A side of the two component system of the present teachings. The calcined kaolin clay may be present in an amount of about 0.25% to about 5% by weight of the first component or A side. The calcined kaolin clay may be present in an amount of about 1% by weight of the first component or A side. The calcined kaolin clay may have an average particle size of 1.3 μm (average stokes equivalent diameter). The calcined kaolin clay may have an average particle size of 3.2 μm) (median malvern laser). Preferred calcined kaolin clay is sold under the trade name KaMin® 70 C commercially available from KaMin® LLC, Macon, GA.

The B side may include one or more phosphate esters. The B side may include phosphoric acid. The B side may include a material for modifying viscosity. The material for modifying viscosity may be a silica-based material. The one or more phosphate esters may be selected from mono-esters, di-esters, or tri-esters as shown below:

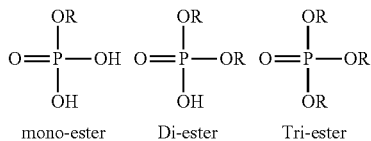

mono-ester    Di-ester    Tri-ester

The one or more esters may be combined with the A side components on their own or may be mixed with phosphoric acid prior to combination with additional components. The resulting reaction of the one or more epoxide functional materials with the phosphoric acid to create a phosphate ester is depicted below:

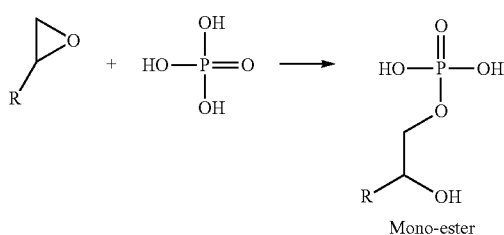

Mono-ester

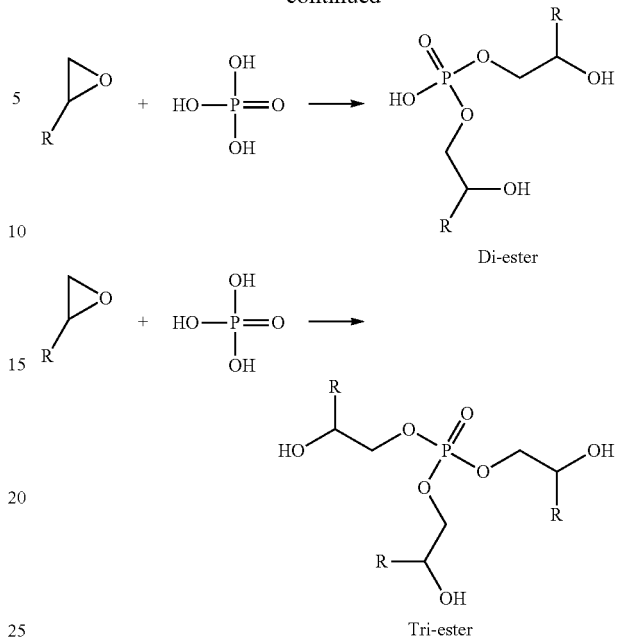

The viscosity of the A side at 23° C. may be from about 20,000 cP to about 50,000 cP or even from about 35,000 cP to about 45,000 cP. The viscosity of the A side at 10° C. may be from about 280,000 cP to about 350,000 cP or even from about 300,000 cP to about 325,000 cP. The viscosity of the B side at 23° C. may be from about 20,000 cP to about 50,000 cP or even from about 35,000 cP to about 45,000 cP. The viscosity of the B side at 10° C. may be from about 130,000 cP to about 220,000 cP or even from about 175,000 cP to about 195,000 cP.

In one non-limiting embodiment of the present teachings, the foam material may include one or more of the following in the first component or A side: liquid epoxy resin, flexible epoxy resin, epoxy phenol novolac resin, aliphatic multifunctional epoxy resin, calcium carbonate, wollastonite, and hydrophobic silica. The foam material may include one or more of the following in the second component or B side: phosphate ester, hydrophobic silica, and phosphoric acid. In one non-limiting embodiment, the present teachings provide a composition comprising: a) a first component including: i) liquid epoxy resin; ii) flexible epoxy resin; iii) epoxy phenol novolac resin; iv) aliphatic multifunctional epoxy resin v) calcium carbonate; vi) wollastonite; and vii) hydrophobic silica; and b) a second component including: i) a first phosphate acid ester; ii) a second phosphate acid ester; iii) hydrophobic silica; and iv) phosphoric acid; and wherein a resulting reaction product of the first component and second component cures at a temperature of less than 50° C.

The foam materials may include one or more additives (e.g., functional additives) for improving one or more various properties of the composition. As examples, additives may include antioxidants, antiozonants, ultraviolet absorbers, antistatic agents, colorants, coupling agents, curing agents, flame retardants, blowing agents, heat stabilizers, impact modifiers, lubricants, plasticizers, preservatives, processing aids and stabilizers and combinations thereof or the like.

A non-limiting example formulation in accordance with the present teachings is provided below at Table 1.

TABLE 1

| | Amount (wt. %) |
|---|---|
| First component or A side | |
| liquid epoxy resin | 18-24 |
| flexible epoxy resin | 12-17 |
| epoxy phenol novolac resin | 10-14 |
| aliphatic multifunctional epoxy resin | 20-28 |
| calcium carbonate (medium fine ground) | 12-17 |
| calcium carbonate (fine particle size) | 3-8 |
| wollastonite | 2-6 |
| hydrophobic silica | 0.1-2.5 |
| Second component or B side | |
| first phosphate acid ester | 50-75 |
| second phosphate acid ester | 20-30 |
| hydrophobic silica | 3-9 |
| phosphoric acid | 5-10 |

Table 2 provides the technical data of a formulation in accordance with the present teachings at a cure temperature of 23° C. and 10° C.

TABLE 2

Physical Characteristics

| | | |
|---|---|---|
| Mix Ratio by Volume | 2:1 | 2:1 |
| Temperature tested | 23° C. | 10° C. |
| Time to Expand (sec) | 20 | 120 |
| Expansion (%) | 350 | 310 |
| Cure time (min) | 7.5 | 9.5 |
| Specific Gravity A side (g/cm³) | 1.14 | |
| Specific Gravity B side (g/cm³) | 1.07 | |
| Cured Specific Gravity (g/cm³) | 0.35 | 0.47 |
| Viscosity A side (cP) @ 100 rad/s | 40 | 315 |
| Viscosity B side (cP) @ 100 rad/s | 39 | 185 |
| Peak Exotherm (° C.) | 127 | 102 |
| Mechanical Properties | | |
| Lap Shear 24 hr. cure time | | |
| Peak Stress (MPa) | 3.0 | (not tested) |
| Peak Load (N) | 1927 | (not tested) |
| Cohesive Failure (%) | 100 | (not tested) |
| Compression 30% Strain | | |
| Peak Stress (MPa) | 0.33 | (not tested) |
| Modulus (MPa) | 8 | (not tested) |
| Energy @ 90% (N*mm) | 3350 | (not tested) |
| Cured Specific Gravity (g/cm³) | 0.32 | (not tested) |
| Tensile Dog Bone JIS-6301-01 | | |
| Peak Stress (MPa) | 0.56 | (not tested) |
| Modulus (MPa) | 8 | (not tested) |
| Strain at Peak (%) | 16 | (not tested) |

Additional examples of formulations in accordance of the present teachings are provided below at Table 3.

TABLE 3

| | A Amt (wt. %) | B Amt (wt. %) | C Amt (wt. %) | D Amt (wt. %) | E Amt (wt. %) | F Amt (wt. %) | G Amt (wt. %) |
|---|---|---|---|---|---|---|---|
| First component or A side | | | | | | | |
| liquid epoxy resin | 21.70 | 21.70 | 21.70 | 21.70 | 21.70 | 21.70 | 21.70 |
| first epoxy phenol novolac resin | 17.74 | 17.74 | 17.74 | 17.74 | 12.74 | 0.00 | 0.00 |
| flexible epoxy resin | 14.15 | 14.15 | 14.15 | 14.15 | 15.15 | 14.15 | 14.15 |
| second epoxy phenol novolac resin | 0.00 | 0.00 | 0.00 | 0.00 | 0.00 | 37.74 | 37.74 |
| aliphatic multifunctional epoxy resin | 20.00 | 20.00 | 20.00 | 20.00 | 24.00 | 0.00 | 0.00 |
| calcium carbonate (medium fine ground) | 15.09 | 15.09 | 15.09 | 15.09 | 15.09 | 15.09 | 15.09 |
| calcium carbonate (fine particle size) | 5.66 | 5.66 | 6.42 | 6.42 | 5.66 | 5.66 | 5.66 |
| hydrophobic silica | 0.94 | 0.94 | 0.90 | 0.90 | 0.94 | 0.94 | 0.00 |
| wollastonite | 4.72 | 4.72 | 4.00 | 4.00 | 4.72 | 4.72 | 4.72 |
| calcined kaolin | 0.00 | 0.00 | 0.00 | 0.00 | 0.00 | 0.00 | 0.94 |
| TOTAL | 100.00 | 100.00 | 100.00 | 100.00 | 100.00 | 100.00 | 100.00 |
| Second component or B side | | | | | | | |
| first phosphate acid ester | 65.42 | 62.16 | 65.42 | 60.34 | 65.42 | 65.42 | 70.53 |

TABLE 3-continued

| | | | | | | | |
|---|---|---|---|---|---|---|---|
| second phosphate acid ester | 28.04 | 26.64 | 28.04 | 25.86 | 28.04 | 28.04 | 27.36 |
| hydrophobic silica | 6.54 | 6.21 | 6.54 | 6.03 | 6.54 | 6.54 | 2.10 |
| phosphoric acid (H3PO4) 85% | 0.00 | 4.99 | 0.00 | 7.77 | 0.00 | 0.00 | 0.00 |
| TOTAL | 100.00 | 100.00 | 100.00 | 100.00 | 100.00 | 100.00 | 100.00 |

| | Control | 5% H3PO4 10° C./ 23° C. | Control 10° C./ 23° C. | 7.8% H3PO4 | 10° C./ 23° C. 10° C. 98 Bs | With second epoxy phenol novolac resin | With kaolin clay |
|---|---|---|---|---|---|---|---|
| Time to exp (sec) | 100 | 30/20 | 60/30 | 20 | 25/90 | 45.0 | 90.0 |
| Peak Exotherm ° F. | 232 | 234/240 | 223/213 | 251 | 233/236 | 220 | 219 |
| Time to Peak exo (min) | 13.0 | 8.5/7 | 12/10 | 6.5 | 9/9 | 9.0 | 11.0 |
| Expansion % | 277 | 310 > 350 | 300/310 | >380 | 345/300 | 210 | 211 |

As depicted in Table 3, the addition of 85% phosphoric acid to the B side results in increased expansion and helps maintain desired expansion levels when temperatures are below 23° C.

The two component system of the present teachings may be provided as side by side cartridges, pails, and drums. The resulting reaction product of the two components cures at a temperature of less than 50° C. and provides excellent adhesion to many substrates along with a fast cure time.

Use of the teachings herein may result in a material that exhibits sufficient flame retardancy to meet one or more of the requirements for demonstrating flame retardancy (e.g., to meet vertical burn and/or smoke density requirements (or some other requirement) as set forth in 14 C.F.R. § 25.853 and 14 C.F.R. § 25.856 (the United States Code of Federal Regulations for compartment interiors, including but not limited to 14 C.F.R. § 25.853(a), and the referenced Appendix F and procedures referenced therein), all of which are incorporated by reference for all purposes.

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of "at least 'x' parts by weight of the resulting composition" also contemplates a teaching of ranges of same recited amount of "x" in percent by weight of the resulting composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. Unless otherwise stated, a teaching with the term "about" or "approximately" in combination with a numerical amount encompasses a teaching of the recited amount, as well as approximations of that recited amount. By way of example, a teaching of "about 100" encompasses a teaching of 100.

The disclosures of all articles and references, including patent applications and publications, are incorporated by reference for ail purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

We claim:

1. A method comprising:
   providing a two component system, the two component system including an A side and a B side, the A side including epoxy and the B side including phosphate ester and phosphoric acid;
   mixing the A side and the B side to form a resulting reaction product;
   wherein the resulting reaction product of the A side and the B side cures at a temperature of less than 50° C.;
   wherein the A side and the B side include at least 0.25% by weight of a fumed silica component;
   wherein the phosphate ester is prepared by reacting a first amount of phosphoric acid and an epoxide functional monomer;
   wherein the phosphoric acid includes a second amount of phosphoric acid; and
   wherein the second amount of phosphoric acid is added after the preparation of the phosphate ester, and the second amount of phosphoric acid is in addition to the first amount of phosphoric acid.

2. The method of claim 1, wherein the B side includes two different phosphate esters.

3. The method of claim 1, wherein the A side, the B side, or both include filler.

4. The method of claim 2, wherein the A side includes calcium carbonate.

5. The method of claim 2, wherein curing occurs at a temperature of from about 10° C. to about 35° C.

6. The method of claim 1, wherein curing occurs at a temperature of from about 15° C. to about 25° C.

7. The method of claim 2, wherein a cure time of the resulting reaction product is less than 15 minutes.

8. The method of claim 5, wherein a cure time of the resulting reaction product is from about 5 minutes to about 10 minutes.

9. The method of claim 1, wherein the method is free of a curing agent.

10. The method of claim 2, wherein the resulting reaction product has a volume expansion of at least 200%.

11. The method of claim 9, wherein the phosphoric acid is mixed with the phosphate ester prior to combining the phosphate ester with the A side components.

12. The method of claim 2, wherein the A side and B side are mixed in a mix ratio by volume of from about 1:4 to about 4:1 (A side:B side).

13. The method of claim 2, wherein the A side and B side are mixed in a mix ratio by volume of about 2:1 (A side:B side).

14. The method of claim 1, wherein the viscosity of the A side at 23° C. is from about 20,000 cP to about 50,000 cP.

15. The composition of claim 1, wherein the A side and B side are in a mix ratio by volume of about 2:1 (A side:B side).

16. The composition of claim 15, wherein the viscosity of the A side at 23° C. is from about 35,000 cP to about 45,000 cP.

17. A composition comprising:
   a) a first component including epoxy;
   b) a second component including phosphate ester and phosphoric acid;
   wherein a resulting reaction product of the first component and second component cures at a temperature of less than 50° C.;
   wherein the first component and the second component include at least 0.25% by weight of a fumed silica component;
   wherein the phosphate ester is prepared by reacting a first amount of phosphoric acid and an epoxide functional monomer;
   wherein the phosphoric acid includes a second amount of phosphoric acid; and
   wherein the second amount of phosphoric acid is added after the preparation of the phosphate ester, and the second amount of phosphoric acid is in addition to the first amount of phosphoric acid.

18. The composition of claim 17, wherein the second component includes two different phosphate esters.

* * * * *